US012445049B2

(12) United States Patent
Bang et al.

(10) Patent No.: US 12,445,049 B2
(45) Date of Patent: Oct. 14, 2025

(54) EMC FILTER FOR ELECTROMAGNETIC REGULATION OF CONVERTER AND MANUFACTURING METHOD THEREOF

(71) Applicant: HYUNDAI MOBIS Co., Ltd., Seoul (KR)

(72) Inventors: Tae Ho Bang, Seoul (KR); Ji Hoon Park, Suwon-si (KR); Hyun Woo Shim, Suwon-si (KR); Du Ho Kim, Yongin-si (KR); Soo Min Jeon, Yongin-si (KR); Deok Kwan Choi, Yongin-si (KR); Won Gon Kim, Yongin-si (KR); Min Heo, Seongnam-si (KR); Kang Min Kim, Seoul (KR); A Ra Lee, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 826 days.

(21) Appl. No.: 17/530,756

(22) Filed: Nov. 19, 2021

(65) Prior Publication Data

US 2022/0166310 A1 May 26, 2022

(30) Foreign Application Priority Data

Nov. 20, 2020 (KR) ........................ 10-2020-0157098

(51) Int. Cl.
*H01F 27/28* (2006.01)
*B60L 53/20* (2019.01)
(Continued)

(52) U.S. Cl.
CPC ............... *H02M 1/44* (2013.01); *B60L 53/20* (2019.02); *H01F 3/14* (2013.01); *H01F 17/06* (2013.01);
(Continued)

(58) Field of Classification Search
CPC ........... H01F 27/2847; H01F 2017/065; H01F 27/08; H01F 17/04; H01F 27/2876;
(Continued)

(56) References Cited

U.S. PATENT DOCUMENTS 5,942,964 A * 8/1999 Takeuchi ............. H05K 9/0066 174/92
6,144,277 A * 11/2000 Matsui .................. H01F 27/027 336/178

(Continued)

*Primary Examiner* — Mangtin Bik Lian
(74) *Attorney, Agent, or Firm* — Morgan, Lewis & Bockius LLP

(57) ABSTRACT

Provided is an electro-magnetic compatibility (EMC) filter including a lower bobbin having a U-shaped cross-sectional shape, a lower core including a magnetic material having a U-shaped cross-sectional shape and disposed on the lower bobbin, a bus bar disposed on the lower core, an upper bobbin having a hollow inside, having a hexahedral shape with one side open, and configured to cover an upper portion of the lower bobbin, and an upper core including a magnetic material having a plate-like shape, disposed in an internal space of the upper bobbin, and disposed on the lower core (U core) to cover the bus bar with a gap maintained by the bus bar between the upper and lower cores when the lower bobbin and the upper bobbin are coupled to each other.

9 Claims, 13 Drawing Sheets

(51) Int. Cl.
*H01F 3/14* (2006.01)
*H01F 17/06* (2006.01)
*H01F 41/02* (2006.01)
*H02M 1/44* (2007.01)

(52) U.S. Cl.
CPC ..... *H01F 27/2847* (2013.01); *H01F 41/0206* (2013.01); *H01F 2017/065* (2013.01)

(58) Field of Classification Search
CPC .......... H01F 27/29; H01F 27/325; H01F 3/10; H01F 2017/046; H01F 17/06; H01F 27/02; H01F 27/22; H01F 27/26; H01F 27/263; H01F 27/266
See application file for complete search history.

(56) References Cited

U.S. PATENT DOCUMENTS

| | | | | |
|---|---|---|---|---|
| 2007/0252669 | A1* | 11/2007 | Hansen | H01F 17/06 336/212 |
| 2014/0313003 | A1* | 10/2014 | Liu | H01F 27/292 336/178 |
| 2017/0012592 | A1* | 1/2017 | Tanimizu | H01F 27/02 |
| 2018/0167046 | A1* | 6/2018 | Schliewe | H03H 7/01 |
| 2018/0323764 | A1* | 11/2018 | Werker | H02M 7/003 |
| 2019/0019609 | A1* | 1/2019 | Fujii | H01F 27/24 |
| 2019/0148049 | A1* | 5/2019 | Takiguchi | H01F 27/025 336/61 |
| 2020/0035413 | A1* | 1/2020 | Hanson | H01F 27/255 |
| 2020/0043643 | A1* | 2/2020 | Yan | H01F 27/306 |
| 2021/0090785 | A1* | 3/2021 | Wang | H01F 27/263 |

* cited by examiner

150: 152, 154, 156

[TOP VIEW]

[SIDE VIEW]

[TOP VIEW]

[SIDE VIEW]

[TOP VIEW]

[SIDE VIEW]

[TOP VIEW]

[SIDE VIEW]

EMC FILTER FOR ELECTROMAGNETIC REGULATION OF CONVERTER AND MANUFACTURING METHOD THEREOF

CROSS-REFERENCE TO RELATED APPLICATIONS

This application claims priority under 35 U.S.C. § 119 to Korean Patent Application No. 10-2020-0157098, filed on Nov. 20, 2020, the disclosure of which is incorporated herein by reference in its entirety.

TECHNICAL FIELD

The present disclosure relates to an external EMC filter for satisfying electromagnetic wave regulation of a converter in a vehicle.

BACKGROUND

A power conversion device for converting and controlling electric energy into various types of power required by each electric device is installed in a vehicle. A typical example of such a power conversion device is a converter (e.g., a DC-DC converter).

An electro-magnetic compatibility (EMC) filter is connected to an output terminal of a converter to reduce electromagnetic noise occurring in an output of the converter.

An EMC filter of a related art includes a bus bar, a core, and a bobbin. According to the EMC filter of the related art, the bobbin accommodates the core, and the core accommodated in the bobbin surrounds the bus bar through which a large current flows. In the case of the core, an air gap is formed inside the core to prevent saturation by a large current.

In the case of the EMC filter of the related art, the bobbin is manufactured to have a special shape to maintain a gap inside the core. However, since the bobbin is formed of a plastic material, it is vulnerable to external vibration and shock.

When the bobbin is damaged by external vibration and impact, it may be difficult to maintain a gap inside the core, and thus, there is a problem in that saturation of the large current flowing in the bus bar cannot be prevented.

In addition, according to a fringing effect, heat is generated in the bus bar by a magnetic field (fringing field) generated in the gap inside the core, thereby increasing a temperature of the bus bar.

SUMMARY

Accordingly, the present disclosure provides an electro-magnetic compatibility (EMC) filter capable of minimizing a temperature rise of a bus bar due to a fringing field generated in a gap of a core and being robust to external vibration and impact, and a manufacturing method thereof.

The above and other objects, advantages and features of the present disclosure, and a method of achieving them will become apparent with reference to the embodiments described below in detail in conjunction with the accompanying drawings.

In one general aspect, an electro-magnetic compatibility (EMC) filter includes: a lower bobbin having a U-shaped cross-sectional shape; a lower core including a magnetic material having a U-shaped cross-sectional shape and disposed on the lower bobbin; a bus bar disposed on the lower core; an upper bobbin having a hollow inside, having a hexahedral shape with one side open, and configured to cover an upper portion of the lower bobbin; and an upper core including a magnetic material having a plate-like shape, disposed in an internal space of the upper bobbin, and disposed on the lower core (U core) to cover the bus bar with a gap maintained by the bus bar between the upper and lower cores when the lower bobbin and the upper bobbin are coupled to each other.

The bus bar may be configured to extend to bypass the gap so as not to overlap the gap.

The bus bar may include a first bus bar configured to extend below a height level of the gap so as not to overlap the gap; and second and third bus bars configured to extend from respective upper end surfaces of two ends of the first bus bar in opposite directions.

A height of the lower core may be a thickness of the second bus bar or the third bus bar, or the height of the lower core may be designed by a following equation: (the height of the lower core=2×a thickness of the first bus bar−the gap).

The EMC filter may further include: a heat dissipation material applied to a portion of the bus bar and a portion of the lower core not covered by the bus bar and exposed upwardly. Here, a portion of the bus bar may be a surface of the first bus bar.

In another general aspect, a method of manufacturing an electro-magnetic compatibility (EMC) filter includes: attaching a lower core having a U-shaped cross-sectional shape to a lower bobbin having a U-shaped cross-sectional shape; attaching a bus bar to the lower core; applying a heat dissipation material to a portion of the bus bar and the lower core exposed upwardly without being covered by the bus bar; attaching an upper core to a lower surface forming an internal space of the upper bobbin; and coupling the lower bobbin and the upper bobbin such that the lower core and the upper core encase the bus bar with a gap between the lower core and the upper core maintained by the bus bar.

In another general aspect, an electro-magnetic compatibility (EMC) filter includes: a lower bobbin having a U-shaped cross-sectional shape; a lower core (U core) having a magnetic material, having a U-shaped cross-sectional shape, and disposed on the lower bobbin; a bus bar disposed on the lower core; an upper bobbin having a plate-like shape and configured to cover an upper portion of the lower bobbin; and an upper core (I core) having a magnetic material, having a plate-like shape, disposed on a lower surface of the upper bobbin, and disposed on the lower core (U core) with a gap maintained by the bus bar when the lower bobbin and the upper bobbin are coupled to each other.

Other features and aspects will be apparent from the following detailed description, the drawings, and the claims.

DETAILED DESCRIPTION OF EMBODIMENTS

Figure 1:
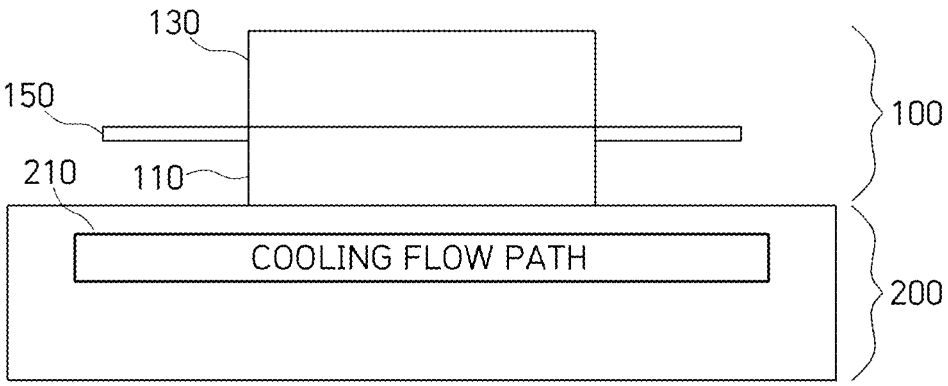
FIG. 1 is a view showing an EMC filter mounted on a converter according to an embodiment of the present disclosure.

Hereinafter, embodiments of the present disclosure will be described in detail with reference to the accompanying drawings.

The advantages, features and aspects of the present disclosure will become apparent from the following description of the embodiments with reference to the accompanying drawings, which is set forth hereinafter. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. In this disclosure, when an element is described as being connected to another element, the element may be directly connected to the other element, or a third element may be interposed therebetween. Also, in the drawings, a shape or a size of each element is exaggerated for convenience of a description and clarity, and elements irrelevant to a description are omitted. Like reference numerals refer to like elements throughout. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

FIG. 1 is a view showing an EMC filter mounted on a converter according to an embodiment of the present disclosure.

Referring to FIG. 1, an EMC filter 100 is formed on a cooling passage 210 in a housing 200 (hereinafter, referred to as an 'outer housing') forming an outer periphery of a converter (e.g., a DC-DC converter).

As shown in FIG. 1, since the EMC filter 100 is directly installed on the cooling passage 210 in the outer housing 200 of the converter, the bus bar in the EMC filter 100 may be efficiently cooled as described hereinafter.

Figure 2:
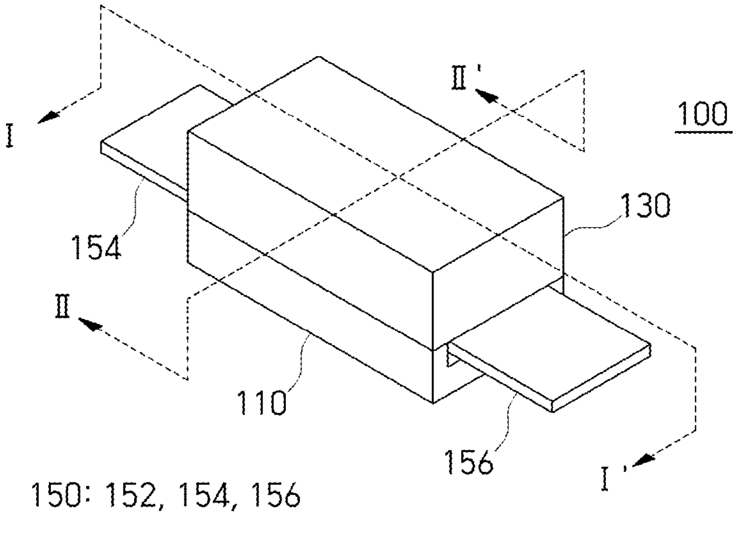
FIG. 2 is a perspective view of an EMC filter according to an embodiment of the present disclosure.
Figure 3A:
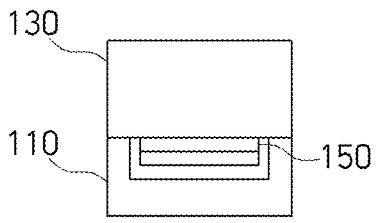
FIGS. 3A and 3B are front views and a top view of the EMC filter shown in FIG. 2 together.
Figure 3B:
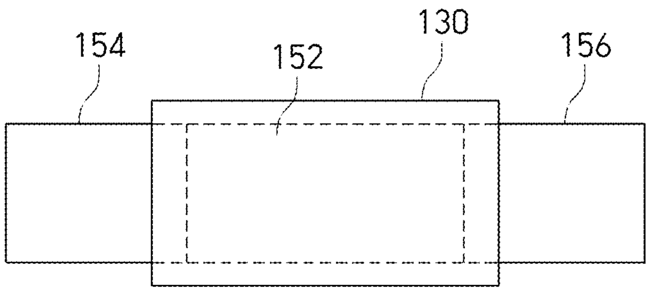
Figure 4:
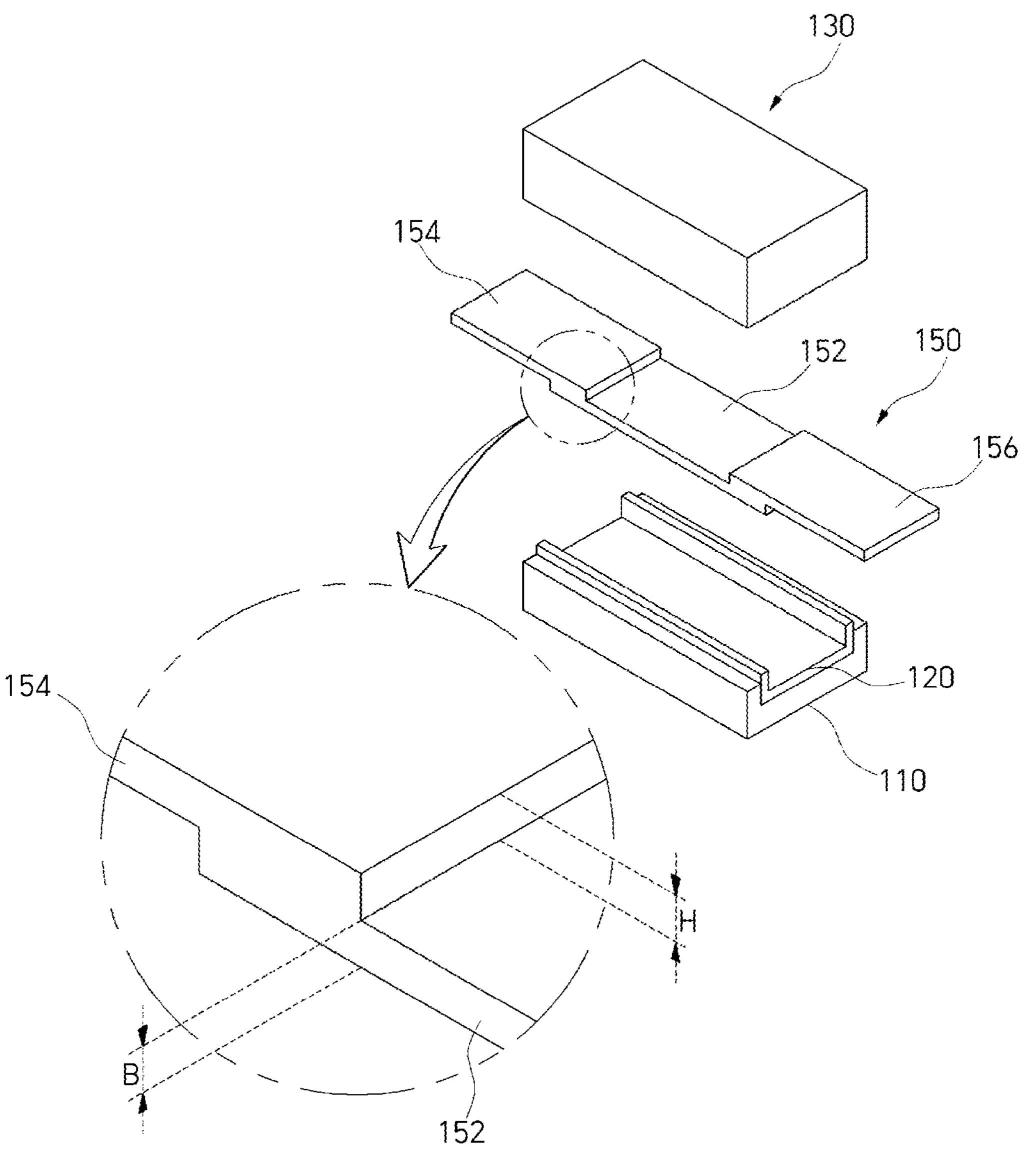
FIG. 4 is an exploded perspective view of the EMC filter shown in FIG. 2.
Figure 5:
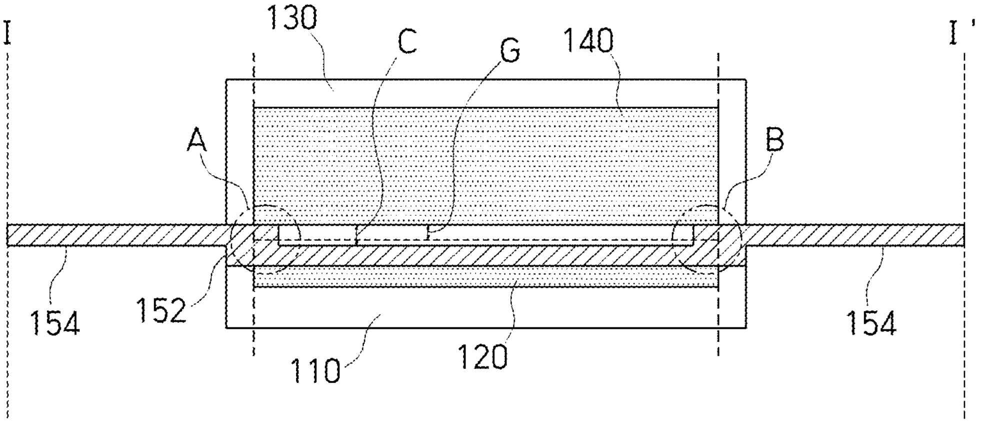
FIG. 5 is a cross-sectional view of the EMC filter, taken along line I-I' shown in FIG. 2.
Figure 6:
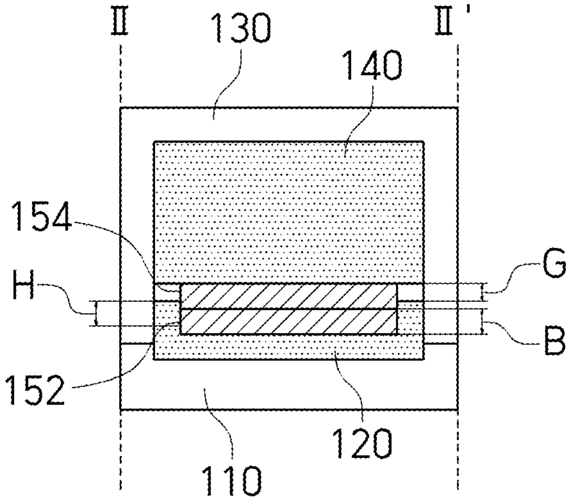
FIG. 6 is a cross-sectional view of the EMC filter, taken along line II-II' shown in FIG. 2.

FIG. 2 is a perspective view of an EMC filter according to an embodiment of the present disclosure, FIGS. 3A and 3B are front views and a top view of the EMC filter shown in FIG. 2 together, FIG. 4 is an exploded perspective view of the EMC filter shown in FIG. 2, FIG. 5 is a cross-sectional view of the EMC filter, taken along line I-I' shown in FIG. 2, and FIG. 6 is a cross-sectional view of the EMC filter, taken along line II-II' shown in FIG. 2.

Referring to FIGS. 2 to 6, the EMC filter 100 includes bobbins 110 and 130, cores 120 and 140 and a bus bar 150.

The bobbins 110 and 130 are configured to include a lower bobbin 110 and an upper bobbin 130 covering an upper portion of the lower bobbin 110.

As shown in FIG. 4, for example, the lower bobbin 110 may be formed to have a U-shaped cross-sectional structure, and the material may be, for example, a plastic material and may be molded to have a U-shaped cross-sectional structure by an injection molding method.

The upper bobbin 130 has one side open and is formed in a hexahedral shape with an empty inside, may be formed of the same material as that of the lower bobbin 110, and may be molded to have a hexahedral shape with one side open and an inside empty by an injection molding method.

The lower core 120 (or a U core) is disposed on the lower bobbin 110. Here, the lower core 120 is also formed to have a U-shaped cross-sectional structure so as to be disposed on the lower bobbin 110 having a U-shaped cross-sectional structure.

The lower core 120 (or a U core) is formed of a magnetic material, and the magnetic material may be, for example, a ferrite-based material.

In an internal space of the upper bobbin 130, the upper core 140, (or an I core in FIGS. 5 and 6) is disposed. In view of the EMC filter 100 of FIGS. 2, 3, and 4, the upper core 140 (I-core) disposed in the internal space of the upper bobbin 130 is not visible, and thus, the upper core 140 (I core) is not illustrated in FIGS. 2, 3, and 4, and illustrated in FIGS. 5 and 6, instead.

As shown in FIG. 6, the upper core 140 is formed in a plate-like shape, unlike the lower core 120 having a U-shaped cross-sectional structure.

The upper core 140 (I core) may also be formed of a magnetic material like the lower core 120 (U core).

When the lower bobbin 110 and the upper bobbin 130 are coupled to each other, a preset gap (G in FIGS. 5 and 6) is formed between the lower core 120 and the upper core 140. The presence of the gap (G in FIG. 6) is to prevent saturation of a large current flowing in the bus bar 150, which will be described below.

The bus bar 150 is disposed on the lower core 120 (U core). Unlike the related art in which a bobbin is manufactured in a special shape to design the gap, in the present disclosure, the gap (in FIGS. 5 and 6) G) is maintained by the bus bar 150 formed of a hard metal material.

Since the gap (G in FIGS. 5 and 6) is maintained by the bus bar 150 formed of a hard metal material, the gap (G in FIG. 6) may be maintained even with strong external vibrations and shocks.

The bus bar 150 disposed on the lower core 120 (U core) includes first to third bus bars 152, 154, and 156 being integrally formed.

The first bus bar 152 is disposed on the lower core 120 (U core), and extends in a straight line under the gap (G in FIGS. 5 and 6) so as not to overlap the gap (G of FIGS. 5 and 6) formed between the lower core (U core) 120 and the upper core (I core) 140.

The second and third bus bars 154 and 156 extend in a straight line in opposite directions from upper end surfaces of both ends of the first bus bar 152, and when manufacturing of the EMC filter 100 is completed by coupling the lower bobbin 110 and the upper bobbin 130, the lower bobbin 110 and the upper bobbin 130 are designed to extend to the outside of a coupled assembly.

The second and third bus bars 154 and 156 are respectively connected to an output terminal (not shown in FIG. 1) formed in the housing (200 in FIG. 1) of the converter disposed therebelow, whereby the EMC filter 100 filters electromagnetic noise occurring at an output terminal of the converter.

The bus bar 150 including the first to third bus bars 152, 154, and 156 may extend to bypasses the gap (G in FIGS. 5 and 6) so as not to overlap the gap (G in FIGS. 5 and 6) and may be designed to be less affected by a magnetic field (fringing field) occurring in the gap (G in FIGS. 5 and 6), thereby minimizing an increase in temperature of the bus bar 150 caused by the magnetic field (fringing field).

Of course, as shown in FIG. 5, the ends A and B of the second and third bus bars formed at the upper end surfaces of both ends of the first bus bar 152 overlap the gap (G of FIGS. 5 and 6), but the degree to which the ends A and B of the second and third bus bars and the gap (G in FIGS. 5 and 6) overlap is not significantly large to be affected by the magnetic field (fringing field).

The bus bar 150 may be formed of a highly conductive metal material. Metal materials are harder than plastic materials. In the present disclosure, as shown in FIGS. 5 and 6, the gap (G in FIGS. 5 and 6) formed between the upper core 120 (U core) and the lower core 140 (I core) is maintained using the bus bar 150 formed of a rigid material.

Accordingly, the gap (G in FIGS. 5 and 6) may be constantly maintained even with strong external vibrations and shocks.

Meanwhile, a height (H in FIGS. 4 and 6) of the lower core 120 (U core) according to an embodiment of the present disclosure is designed according to a thickness (B in FIGS. 4 and 6) of the first bus bar 152.

Here, the height H of the lower core 120 (U core) may be a thickness of the second and third bus bars 154 and 156. In this case, the thicknesses of the second and third bus bars 154 and 156 are equal, and the thickness of the first bus bar 152 (B in FIGS. 4 and 6) may be different from the thickness of the second bus bar 154. In this embodiment, it is assumed that the thickness of the first bus bar 152 (B in FIGS. 4 and 6) is different from the thickness of the second and third bus bars 154 and 156.

In this embodiment, the height H of the lower core 120 (U core) may be designed by the following equation.

Height of lower core (H in FIGS. 4 and 6)=2×thickness of first bus bar 152 (B in FIGS. 4 and 6)−gap (G in FIGS. 5 and 6) [Equation 1]

FIGS. 7 to 12 are views showing a manufacturing process of an EMC filter according to an embodiment of the present disclosure.

Figure 7:
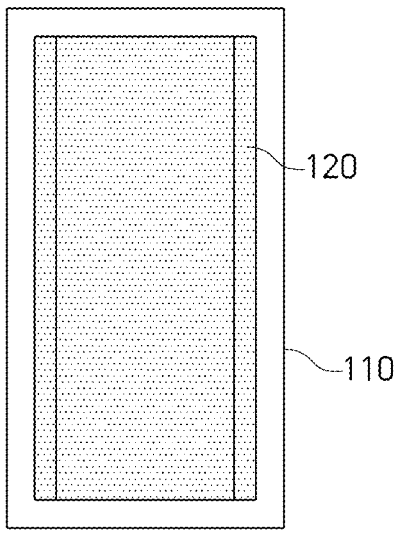
FIGS. 7 to 12 are views showing a manufacturing process of an EMC filter according to an embodiment of the present disclosure.
Figure 7:
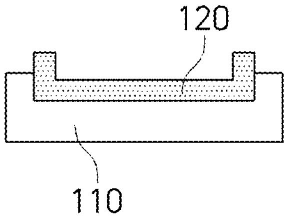

First, referring to FIG. 7, the lower bobbin 110 having a U-shaped cross-sectional structure is prepared, and the lower core 120 having a U-shaped cross-sectional structure is seated on the lower bobbin 110 through a bonding process.

Figure 8:
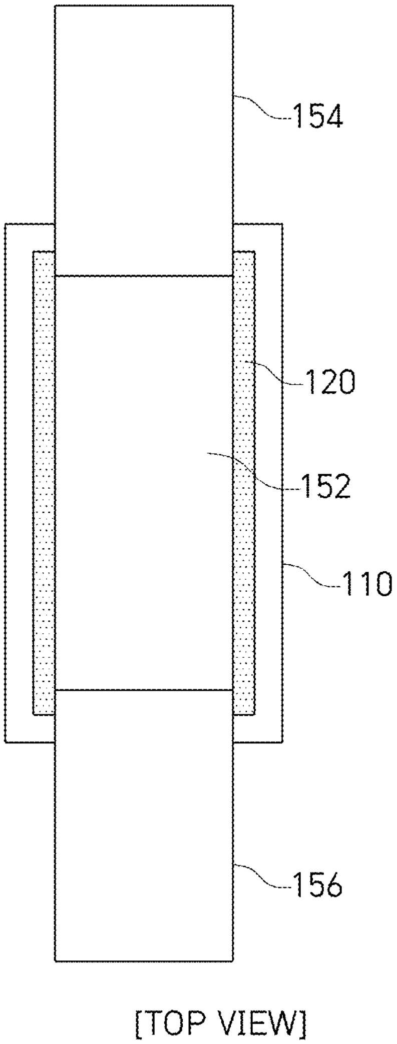
Figure 8:
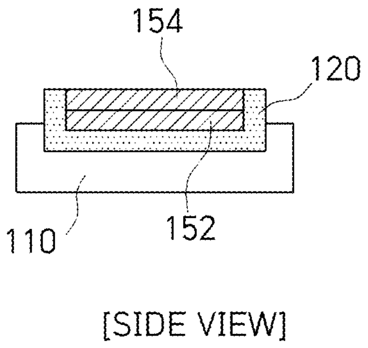

Next, referring to FIG. 8, the bus bars 150 (152, 154, and 156) are seated on the lower core 120 (U core) through a bonding process.

Figure 9:
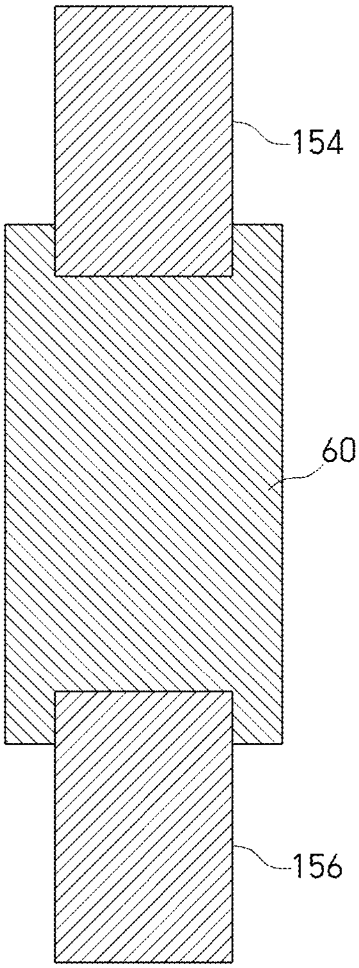
Figure 9:
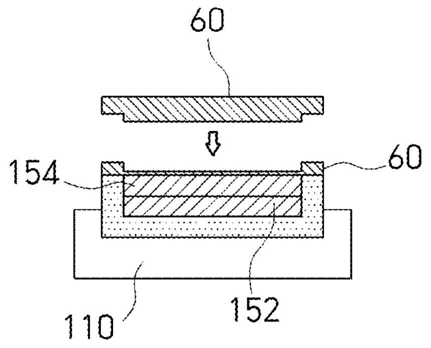

Next, referring to FIG. 9, a process of applying a heat dissipation material 60 is applied to the first bus bar 152 constituting the bus bars 150 (152, 154, and 156) and the lower core 120 (U core) not covered by the bus bars 150 (152, 154, and 156) but exposed upwardly. Here, the heat dissipation material 60 may be, for example, thermal grease.

Figure 10:
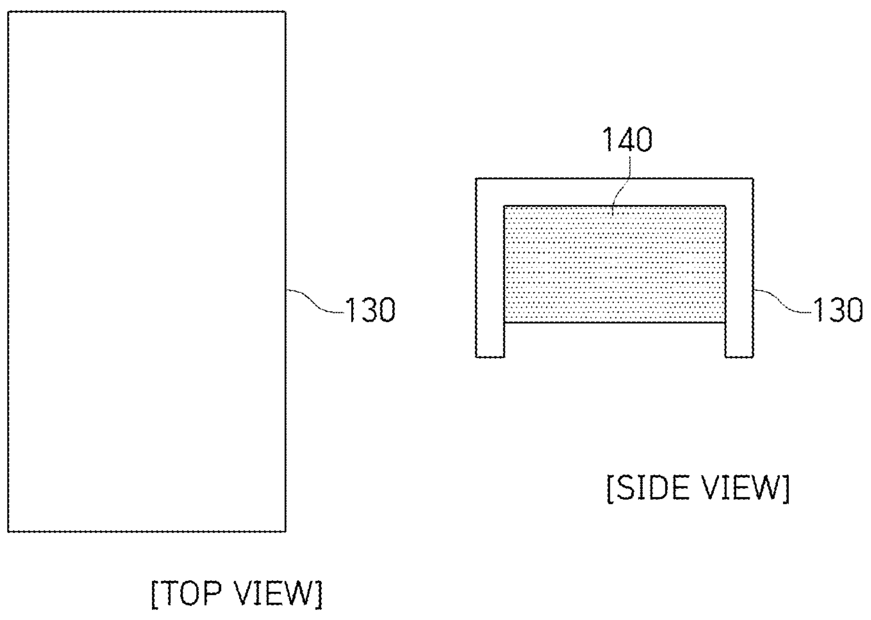

Next, referring to FIG. 10, the upper bobbin 130 is prepared, and the upper core 140 is seated on a bottom surface forming the internal space of the upper bobbin 130 through a bonding process. Here, the process of FIG. 10 may be performed simultaneously with the process of FIG. 7.

Figure 11A:
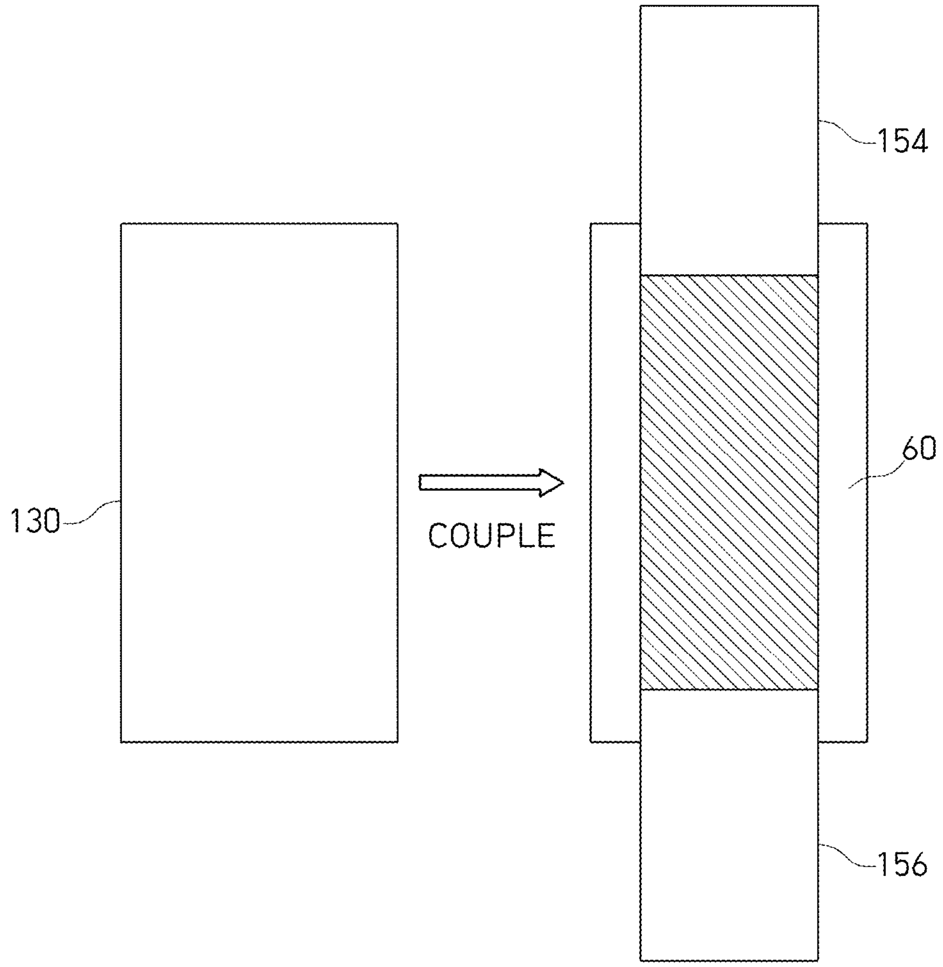
Figure 11B:
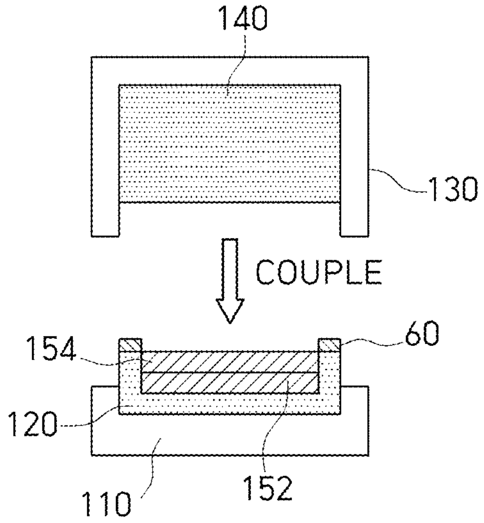
Figure 12:
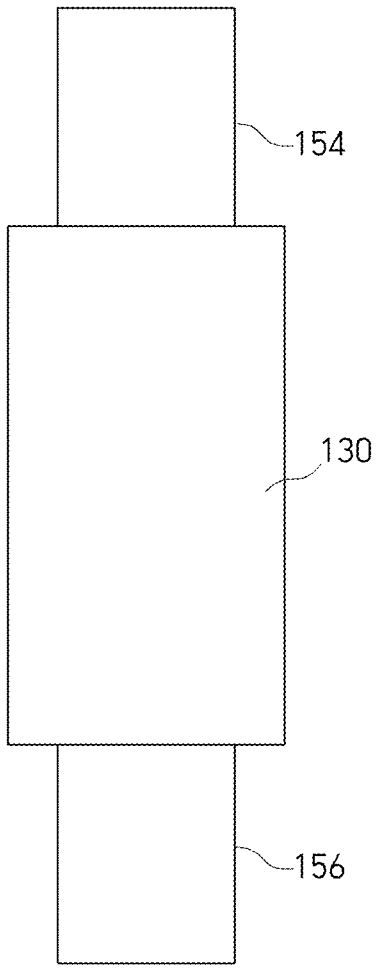
Figure 12:
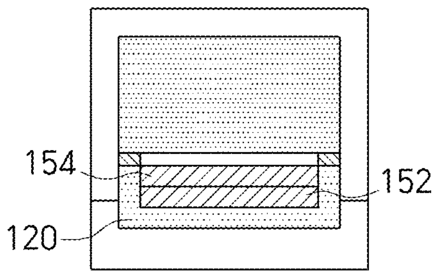

Next, referring to FIGS. 11A, 11B and 12, the lower bobbin 110 and the upper bobbin 130 are coupled, and the upper bobbin 130 covers the first bus bar 152 and the lower core 120 to which the heat dissipation material 60 is applied.

According to the coupling process of the lower bobbin 110 and the upper bobbin 130, the lower core 120 and the upper core 140 encase the bus bars 150 with the preset gap (G in FIGS. 5 and 6) therebetween. At this time, the first bus bars 152 constituting the bus bars 150 (152, 154, and 156) are disposed below the gap (G in FIGS. 5 and 6), whereby the bus bars 150 (152, 154, and 156) extend in a structure bypassing the gap (G in FIGS. 5 and 6).

In this manner, as the bus bars 150 (152, 154, and 156) extend in the structure bypassing the gap (G in FIGS. 5 and 6) as a whole, and overlap between the bus bars 150 (152, 154, and 156) and the gap (G in FIGS. 5 and 6) is minimized, so that the bus bars 150 (152, 154, and 156) are less affected by the magnetic field (fringing effect) occurring in the gap (G in FIGS. 5 and 6). Therefore, it is possible to minimize an increase in the temperature of the bus bars 150 (152, 154, 156) due to the magnetic field (fringing effect).

In addition, since the bus bars 150 (152, 154, and 156) of a hard material such as a metal material maintain (or support) the gap (G in FIGS. 5 and 6), the gap (G in FIGS. 5 and 6) may be constantly maintained even with external vibrations and shocks.

Figure 13:
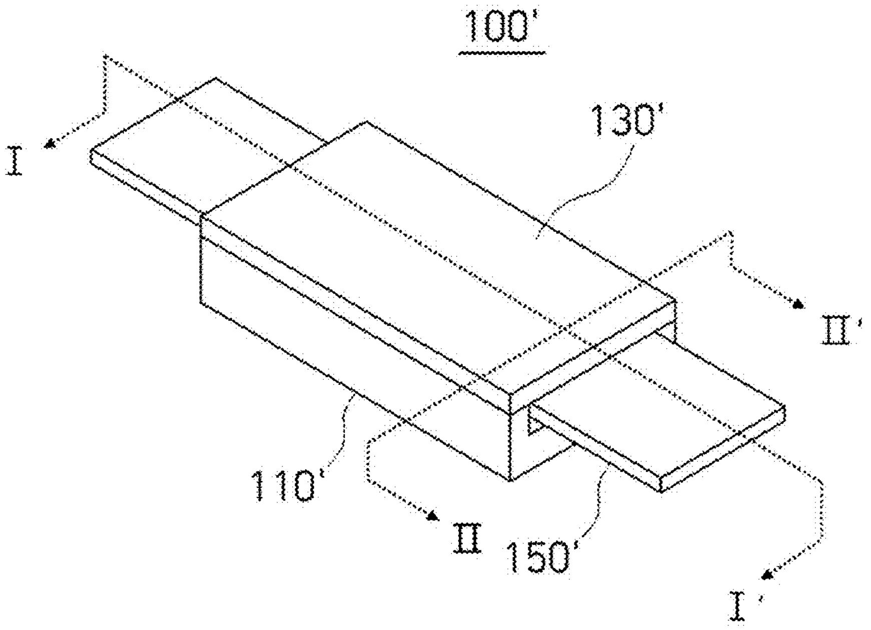
FIG. 13 is a perspective view of an EMC filter according to another embodiment of the present disclosure.
Figure 14:
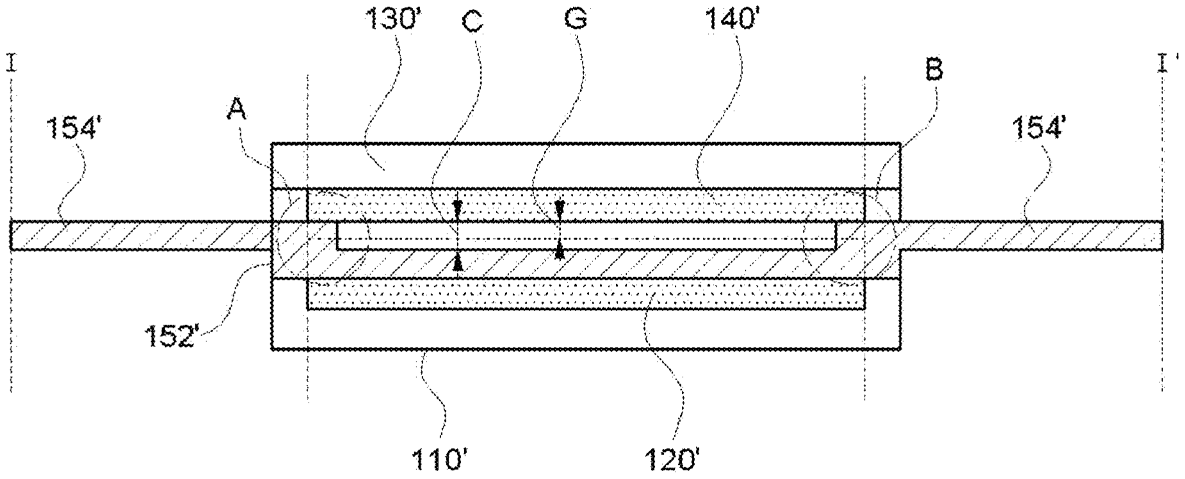
FIG. 14 is a cross-sectional view of the EMC filter, taken along line I-I' shown in FIG. 13.
Figure 15:
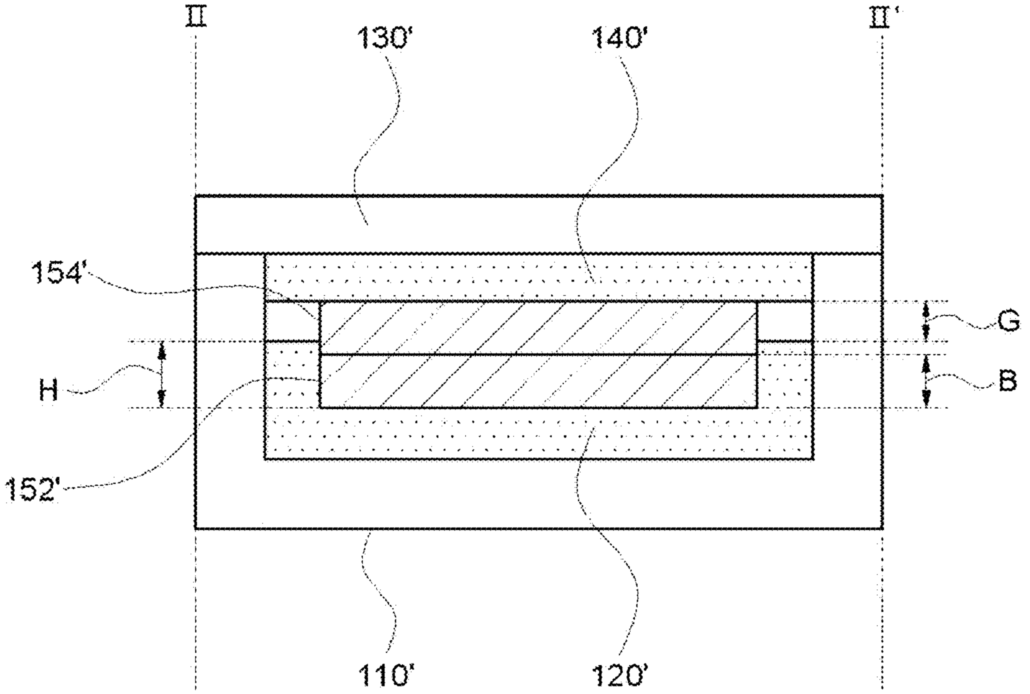
FIG. 15 is a cross-sectional view of the EMC filter, taken along line II-II' shown in FIG. 13.

FIG. 13 is a perspective view of an EMC filter according to another embodiment of the present disclosure.

Referring to FIG. 13, an EMC filter 100' according to another embodiment of the present disclosure includes a lower bobbin 110', an upper bobbin 130', and a bus bar 150'.

The lower bobbin 110' according to another embodiment may be implemented to have the same structure and function as the lower bobbin 110 described above with reference to FIGS. 2 to 12, and the bus bar 150' according to another embodiment is also implemented to have the same structure and function as the bus bar 150 described above with reference to FIGS. 2 to 12.

Therefore, the description of the lower bobbin 110' and the bus bar 150' according to another embodiment of the present disclosure is replaced with the description of the lower bobbin 110 and the bus bar 150 described above with reference to FIGS. 2 to 12.

However, the upper bobbin 130' according to another embodiment is different from the upper bobbin 130 formed of a hexahedral shape with one side open and an empty inside a described above in that the upper bobbin 130' has a plate-like shape. In this case, the upper core may be disposed on a lower surface of the upper bobbin 130', rather than on a bottom surface forming an internal space of the upper bobbin 130', unlike the embodiment described above.

Except for the shape difference, the upper bobbin 130' and the upper bobbin 130 described above are implemented to have the same function. Therefore, the description of the upper bobbin 130' is also replaced with the description of the upper bobbin 130 described above.

According to the EMC filter of the present invention, a heat dissipation material is applied on a bus bar extending to bypass a gap (gap between an upper core and a lower core) inside the core, thereby minimizing a temperature rise of a bus bar that occurs due to a fringing effect (fringing field) in the gap inside the core.

In addition, since the EMC filter of the present disclosure is directly installed on a cooling passage in the outer housing of the converter, cooling efficiency of the bus bar is improved.

In addition, according to the EMC filter of the present disclosure, by maintaining the gap inside the core (the gap between the upper core and the lower core) with a bus bar formed of a hard metal material, the gap inside the core may be maintained even for strong external vibrations and shocks.

In addition, according to the EMC filter of the present disclosure, as described above, since the bus bar maintains the gap inside the core (the gap between the upper core and the lower core), as in the prior art, the bobbin has a special shape to maintain the gap, the bobbin may be manufactured to have a simple shape, rather than a special shape for maintaining the gap, thereby reducing time and cost required for manufacturing the bobbin.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electro-magnetic compatibility (EMC) filter includes:

a lower bobbin having a U-shaped cross-sectional shape;

a lower core including a magnetic material having a U-shaped cross-sectional shape and disposed on the lower bobbin;

a bus bar disposed on the lower core;

an upper bobbin having a hollow inside, having a hexahedral shape with one side open, and covering an upper portion of the lower bobbin; and an upper core including a magnetic material having a plate-like shape, disposed in an internal space of the upper bobbin, and disposed on the lower core to cover the bus bar with a gap maintained by the bus bar between the upper and lower cores when the lower bobbin and the upper bobbin are coupled to each other, wherein the bus bar includes:

a first bus bar disposed in a space defined by the U-shaped cross-sectional shape of the lower core and including an upper surface extending below a height level of a portion of the lower core overlapping the gap; and second and third bus bars configured to extending from respective upper end surfaces of two ends of the first bus bar in opposite directions away from each other.

2. The EMC filter of claim 1, wherein the bus bar extends to bypass the gap so as not to overlap the gap.

3. The EMC filter of claim 1, wherein a height of the lower core is a total thickness of the second bus bar or and the third bus bar.

4. The EMC filter of claim 1, wherein a height of the lower core is designed by a following equation:

(the height of the lower core=2×a thickness of the first bus bar−the gap).

5. The EMC filter of claim 1, further comprising:

a heat dissipation material applied to a portion of the bus bar and a portion of the lower core not covered by the bus bar and exposed upwardly.

6. The EMC filter of claim 1, wherein the EMC filter further includes a heat dissipation material applied to a portion of the lower core not covered by the bus bar and exposed upwardly and a portion of the first bus bar.

7. An electro-magnetic compatibility (EMC) filter comprising:

a lower bobbin having a U-shaped cross-sectional shape;

a lower core having a magnetic material, having a U-shaped cross-sectional shape, and disposed on the lower bobbin;

a bus bar disposed on the lower core;

an upper bobbin having a plate-like shape and configured to cover an covering upper portion of the lower bobbin; and an upper core having a magnetic material, having a plate-like shape, disposed on a lower surface of the upper bobbin, and disposed on the lower core with a gap maintained by the bus bar when the lower bobbin and the upper bobbin are coupled to each other, wherein the bus bar includes:

a first bus bar disposed in a space defined by the U-shaped cross-sectional shape of the lower core and including an upper surface extending below a height level of a portion of the lower core overlapping the gap; and second and third bus bars overlapping and extending from respective upper end surfaces of two ends of the first bus bar in opposite directions, wherein the first bus bar and the second or third bus bar are stacked on each other, such that the first bus bar is in contact with a portion of the lower core that overlaps the bus bar, and the second or third bus bar is in contact with a lower surface of the upper core.

8. The EMC filter of claim 7, wherein the bus bar extends to bypass the gap so as not to overlap the gap.

9. The EMC filter of claim 7, wherein a heat dissipation material is applied to a portion of the bus bar and a portion of the lower core not covered by the bus bar and exposed upwardly.

* * * * *